Ellington M. Magee  Inventor

By *Seymour Stahl*

Patent Attorney

United States Patent Office 3,232,991
Patented Feb. 1, 1966

3,232,991
PREPARATION OF FORMALDEHYDE
Ellington M. Magee, Scotch Plains, N.J., assignor to Esso Research and Engineering Company, a corporation of Delaware
Filed June 28, 1962, Ser. No. 205,914
The portion of the term of the patent subsequent to Apr. 30, 1979, has been disclaimed
3 Claims. (Cl. 260—604)

This invention relates to the preparation of formaldehyde by the partial oxidation of $C_1$–$C_3$ paraffins under novel conditions yielding superior results. More particularly, this invention relates to the partial oxidation of methane in the presence of nitrogen oxide and carried out in a reactor having its internal surface coated with lead oxide.

The prior art is replete with disclosures of various processes for the partial oxidation of methane and natural gas to formaldehyde employing a variety of conditions. All of these prior art processes embody various economic drawbacks which relate to the relatively low yields and/or poor selectivities obtained. In addition, many prior art processes are unacceptable due to the erratic nature of the reaction. As an example, U.S. 1,776,771 describes a process for partially oxidizing methane in the presence of zinc oxide and lead oxide, employing high pressures in the order of 60–300 atmospheres. This particular process has the drawback of requiring high pressures which can be a serious safety hazard since the reaction is highly exothermic, difficult to control, and lends itself toward explosions. On the other hand, the employment of this prior art technique at atmospheric or low pressures, even if higher temperatures are used, is ineffective in producing acceptable yields of formaldehyde.

Other techniques have been suggested for the partial oxidation at atmospheric conditions, one such being described in U.S. 2,244,241, which employs a zinc oxide coated reactor and nitric oxide catalyst. This process is similarly uneconomical due to the erratic behavior of the reaction and the failure to obtain reproducible results by this technique.

It has now been discovered that $C_1$–$C_3$ paraffins and in particular methane may be partially oxidized with an oxygen containing gas by carrying out the reaction in a reactor having its internal surface coated with lead oxide and employing nitrogen oxides as a co-catalyst at elevated temperatures and atmospheric or moderately low pressures. The process to be described in greater detail includes in one embodiment the addition of a nitrogen oxide which may be added in the form of nitric acid, nitric oxide (NO), nitrogen dioxide ($NO_2$) or the like to the methane or other paraffin containing stream. The resulting gas is then mixed with an oxygen containing stream and passed to a reactor, the internal walls of which are coated with lead oxide. The gases are then heated to partially oxidize the hydrocarbons into gaseous products including formaldehyde, and the formaldehyde is recovered for use and, if desired, the unused hydrocarbons are recycled.

The invention, as well as its many advantages, will be further understood by reference to the following detailed description and drawings, in which.

Figure 1:
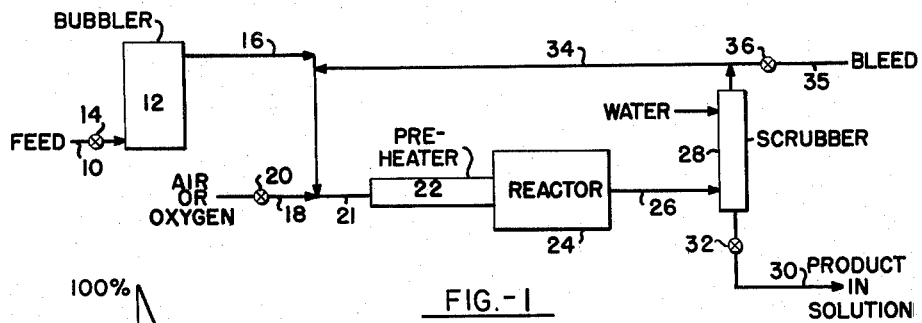
FIGURE 1 is a schematic flow diagram showing one manner in which the new process is carried out.

Referring to FIGURE 1, a feed, which may consist entirely of methane, is conducted through pipe 10 to a bubbler 12. While methane can be used in a pure state, natural gas is less expensive and due to the pressure of $C_2$ and $C_3$ paraffins produces even higher yields than the pure methane. The selection of a particular feed will be dependent primarily on the availability of the particular gas. The flow of feed is controlled by means of a valve 14 in pipe conduit 10. The bubbler 12 may contain nitric acid which is added to the gas stream. The nitric acid may range generally from a mixture of 50% concentrated nitric acid and 50% water to 100% concentrated nitric acid.

Actually nitric acid is picked up and dissolved in the gases bubbled through. The desired concentration of nitric acid in the feed gases is readily controlled by varying either the concentration of nitric acid employed or by varying the gas mixture bubbled through. As an example, various concentrations of $HNO_3$ in gas where obtained as shown in the following table. It is understood that the final mixture can be diluted to any desired concentration by addition of air, methane or diluent if desired.

TABLE I

| Gas composition, vol. percent | $HNO_3$, wt. percent composition | Temp., °C. | $HNO_3$, vol. percent concentration in gas |
|---|---|---|---|
| 33⅓ $CH_4$ 66⅔ Air | 70 | 0 | 0.473 |
| Air | 35 | 0 | 0.117 |
| Air | 52 | 0 | 0.20 |

While the use of nitric acid as a source of nitrogen oxide is preferred for reasons of convenience, gaseous NO and/or $NO_2$ may be employed with equal success. The nitrogen oxide should be employed in catalytic amounts, that is, amounts sufficient to significantly increase the yield of formaldehyde. These amounts will vary depending on the concentration of methane in the feed gas and on other considerations. However, for most purposes an amount of nitrogen oxide between 0.01 and 1 mole percent based on methane should be employed.

The feed is thus bubbled upwardly through the nitric acid in bubbler 12. The resulting gases are conducted through gas conduit 16.

A free-oxygen containing gas, such as air or oxygen, is conducted through gas conduit 18 under control of valve 20 and mixed with the gases flowing through gas conduit 16. The flow of gases through gas conduits 16 and 18 are controlled to provide the proper ratio of methane with respect to oxygen.

With regard to the oxygen containing gas it has been found that air or oxygen diluted with inert gases such as nitrogen may be employed or if desired a pure oxygen stream may be used. In any case the amount of oxygen in the free oxygen containing gas should be maintained between 2–20 mole percent based on methane. Amounts below 2 mole percent do not effect a high enough conversion to formaldehyde for commercial purposes whereas amounts of oxygen significantly over 20 mole percent will cause oxidative degradation of the formaldehyde formed, also resulting in poor selectively and yields. Higher concentrations of oxygen will cause the product to burn.

The mixture of gases flowing through gas conduit 16 and air or oxygen flowing through gas conduit 18 is conducted through conduit 21 to a preheater 22. In the preheater 22 the mixture is preheated to the desired reaction temperature. The mixture is then caused to react in reactor 24 and the hydrocarbons oxidized into gaseous products, including the desired formaldehyde.

Reactor 24 has its reactor walls coated with lead oxide in a suitable manner. The coating may be applied by washing the reactor with a 10% solution of Pb(NO$_3$)$_2$ in water, draining and decomposing the Pb(NO$_3$)$_2$ to PbO by heating. The thickness of the coating is not regarded as critical except that sufficient PbO must be on the surface to catalyze the reaction. This catalytic effect of PbO is obtained only when employed in combination with the use of a nitrogen oxide catalyst. The PbO coating may range from a monomolecular layer to 10 or more mils. Actually the amount of lead oxide deposited need not be measured since the catalytic efficiency of the lead oxide does not appear to depend on the deposition of large quantities of lead oxide on the reactor walls. The PbO surface effect can be achieved by the use of ceramic or the like packing which has been coated with PbO; however, coating the interior wall of the reactor as indicated above is considered efficient, economic, and therefore preferred.

If desired, means may be provided to continuously flow small solid lead oxide coated materials through the lead oxide coated reactor 24. It has been found that lead oxide coated materials used as raining solids give superior results over the use of other materials as solids.

The reactor may be made of ceramic material such as glass, or other materials such as stainless steel, quartz, or the like.

While the thickness of the PbO layer does not appear to be critically significant, there has been found a definite effect which is related to the PbO surface to reactor volume ratio regarding the formaldehyde yields obtainable. Good results are achieved when employing a surface to volume ratio of 2–37 cm.$^{-1}$. A surface to volume ratio below 2 cm.$^{-1}$ does not effect sufficient catalytic action to obtain the conversions and yields desired for commercial purposes, whereas a surface to volume ratio significantly above 37 cm.$^{-1}$ unexpectedly promotes nonselective, undesirable side reactions including oxidative degradation.

The gases from the reactor 24 are conducted through gas conduit 26 to a water scrubbing system illustrated by scrubber 28. The desired intermediate products, including formaldehyde are thus passed into solution with the water. The product may be removed from the scrubber 28 through liquid conduit 30 under control of valve 32. The unused methane may be recycled to conduit 16 by means of gas conduit 34. A bleed line 35 controlled by valve 36 is provided for removal of some of the product gases making room for fresh feed.

Figure 2:
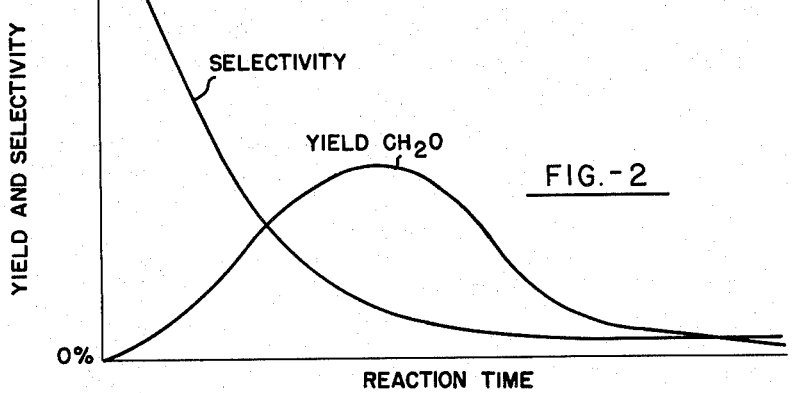
FIGURE 2 is a graph useful in explaining the manner in which the process is carried out.

The graph shown in FIGURE 2 represents typical curves of selectivity and yield of CH$_2$O with respect to the time of reaction. In the oxidation of methane to formaldehyde, the selectivity curve varies from 100% formaldehyde at very short reaction times to close to zero at longer reaction times, as indicated in FIGURE 2. The yield of formaldehyde increases with reaction time to a maximum and then decreases as more and more formaldehyde decomposes into the unwanted carbon monoxide and carbon dioxide by-products. The selectivity is defined as Selectivity per cent =
$$\frac{\text{moles CH}_2\text{O}}{\text{moles CH}_2\text{O + moles CO + moles CO}_2} \times 100$$

The yield is based on methane and is equal to $$\text{Yield percent} = \frac{\text{moles CH}_2\text{O}}{\text{moles feed CH}_4} \times 100$$

Both the yield and the selectivity are important in the process. If the selectivity is fairly high at the point of greatest yield, a greater portion of the essential CH$_4$ fed into the process is converted to carbon monoxide and carbon dioxide than if the selectivity is low. This means that a greater portion of the methane is left unreacted and can be recycled so that the ultimate product is greater with a higher selectivity even though the yield per pass may be the same.

Contact or reaction time, that is the time during which the feed gases are maintained in contact with oxygen, nitrogen oxide, and the lead oxide coated reactor walls at reaction temperatures should be maintained between 0.05–5 seconds, preferably 0.1–1 second. Prolonged contact times adversely affect selectivity to the desired formaldehyde.

The process described in relation to FIGURE 1 provides a many times over greater yield of formaldehyde when compared with the yields obtained using only the nitric acid or only the lead oxide coated reactor as evidenced by Examples 1–3 which follow.

Example 1 (NO only)

Figure 3:
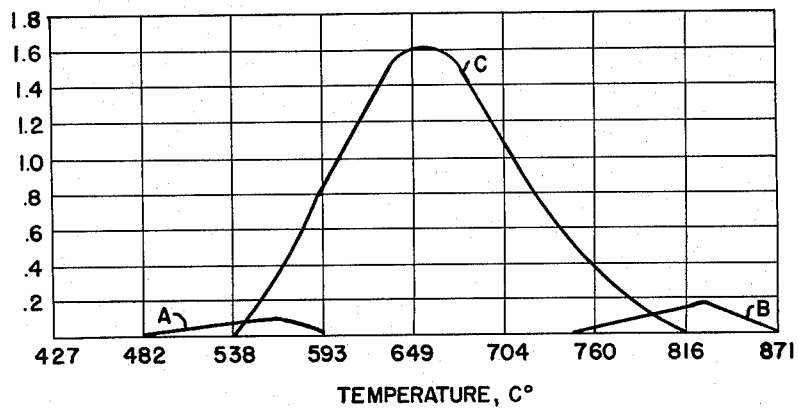
FIGURES 3 and 4 are graphical presentations reflecting experimental data.

Methane was bubbled through a solution of 50% concentrated nitric acid and 50% water to obtain an NO concentration of 0.12 vol. percent on CH$_4$ and mixed with oxygen in a 4:1 ratio of methane to oxygen. This mixture was then mixed with an equal volume of nitrogen with 4 cubic feet of methane per hour being passed through the reactor. The gaseous mixture was preheated in a ¼″ diameter stainless steel tube which was not coated with lead oxide and then passed through a ½″ outside diameter reactor of the same composition whose volume was 4.3 cubic inches. The exit gases were passed through water scrubbers cooled by an ice bath. The reaction temperatures ranged from 480° C. to 585° C. The greatest yield of formaldehyde obtained was only 0.05 mole percent at 585° C. This curve is shown by Curve A of FIGURE 3. The selectivity of formaldehyde in mole percent at the temperature of greatest yield was only 0.67. The reaction time or contact time was 0.8 second.

Example 2 (PbO surface only)

A similar experiment was then carried out employing a stainless steel reactor of the same size which had been coated with lead oxide by washing the internal walls of the reactor with a 10% solution of lead nitrate and water and subsequently drying and decomposing the lead nitrate to form lead oxide. In this experiment no nitrogen oxide of any form was employed and the greatest yield of formaldehyde in mole percent was 0.19 at about 825° C. The selectivity of formaldehyde in mole percent was only about 4.00 to 5.00 at 825° C. The reaction time was 0.8 second as in the preceding run and the yield curve obtained is indicated by Curve B of FIGURE 3.

Example 3

Continuous runs employing conditions similar to Example 2 were carried out by first bubbling methane through 50% concentrated nitric acid and water with a methane to oxygen ratio of 4:1. The gases were heated in a preheater and passed through the lead oxide coated reactor described previously. A yield of 1.6 mole percent formaldehyde was obtained at about 650° C. The same runs were carried out employing concentrated nitric acid through which methane was bubbled and appreciable yields of formaldehyde were obtained in a temperature range of 540°–815° C. The yield curve for these runs is shown by Curve C in FIGURE 3. The selectivity at the reaction temperature of 650° C. was 32% at a reaction time in the lead oxide coated reactor of 0.3 second.

In all experiments the nitric acid bubbler was at 0° C. to give an NO concentration of about 0.12 vol. percent, on CH$_4$ and all pressures were essentially atmospheric.

To further demonstrate the superior results obtained by resort to the present process as compared to processes employing catalysts and procedures of the prior art, reference is had to the following example.

Example 4

The procedure of Example 3 was followed using a pure methane mixed with air and containing 33⅓% methane as the gaseous reaction mixture. This reaction mixture was passed through a reactor which had been previously coated with zinc oxide at a reaction temperature of 650° C. The contact time was 0.6 second. A number of runs were carried out at these conditions to obtain a variety of results. In the first experiment 1.5 mole percent formaldehyde was obtained; in the second 0.021 mole percent was obtained using exactly the same experimental conditions. In all runs in this Example 4 nitrogen oxide was supplied by bubbling the methane through 70% nitric acid. To confirm the fact that zinc oxide produces erratic results, another series of experiments were carried out employing the same conditions except for the temperature which was lowered to 600° C. Yields of 1.45%, 0.02% and 2.10% of formaldehyde were obtained.

*Example 5*

The procedure and conditions of Example 4 were repeated except that a lead oxide coated reactor was employed. A reaction temperature of 500° C. gave yields of 2.29% and 2.23% of formaldehyde. Two additional runs were carried out at slightly elevated temperatures of 550° C. to obtain yields of 3.13% and 3.4% of formaldehyde.

To further illustrtae the unusual and unexpected results obtained by resort to the present invention, reference is now had to Table II which follows. Table II summarizes the results of Examples 1–5.

TABLE II

| Example | Metal oxide coating | Nitrogen oxide* | Temp., °C. | Formaldehyde yield, mole percent |
|---|---|---|---|---|
| 1 | None | Yes | 585 | 0.052 |
|   |      |     |     | 0.67 |
| 2 | PbO | None | 825 | 0.19 |
| 3 | PbO | Yes | 650 | 1.6 |
| 4 | ZnO | Yes | 650 | 1.5 |
|   |     |     |     | 0.021 |
|   |     |     | 600 | 1.45 |
|   |     |     |     | 0.02 |
|   |     |     |     | 2.10 (erratic) |
| 5 | PbO | Yes | 500 | 2.29 |
|   |     |     |     | 2.23 |
|   |     |     | 550 | 3.13 |
|   |     |     |     | 3.4 |

*Obtained by bubbling feed gas through $HNO_3$ at 0° C. and atmospheric pressure.

It is apparent from the above data that zinc oxide and lead oxide exhibit similar characteristics only when nitrogen oxide is absent and without nitrogen oxide the results are inferior. With the utilization of nitrogen oxide as the homogeneous catalyst, lead oxide gives desirable economic and commercially employable results, whereas zinc oxide appears to be completely unreliable.

The surface to volume ratio in the lead oxide coated reactor plays an important role in obtaining economically feasible yields of formaldehyde. From a cost standpoint, the larger the surface to volume ratio in the reactor, the more expensive the equipment is. However, it has been found that when the surface to volume ratio falls below 8 cm.$^{-1}$, the yield of formaldehyde falls off rapidly as does the selectivity. The selectivity and yield are improved only slightly by increasing the surface to volume ratio higher than 20 cm.$^{-1}$ and above 37 cm.$^{-1}$ no appreciable increase is noted. On the contrary, poorer results are noted with a surface to volume ratio of over 50 cm.$^{-1}$. Accordingly, a practical range of surface to volume ratio is 2–37 cm.$^{-1}$ and more preferably between 8–20 cm.$^{-1}$.

*Examples 6 and 7*

Continuous runs were carried out as in Example 5 except that in Example 6 a PbO surface to volume ratio varying between 2½ to 37 cm.$^{-1}$ was employed, whereas in Example 7 an extremely high surface to volume ratio obtained by employing porous PbO pellets was used. In Example 6 formaldehyde yields ranged between 2.6 and 3.25 mole percent. Lowest yields were obtained at the 2½ cm.$^{-1}$ surface to volume ratio and increased to a peak at about 8–10 cm.$^{-1}$ dropping off slightly at 37 cm.$^{-1}$. In Example 7 employing porous PbO the maximum yield was 0.05 mole percent.

It has also been found that the most economical process is not one carried out under conditions that give the highest yield. Within the limits of pressure, surface to volume ratio and reactant and nitrogen oxide catalyst concentrations recited herein, operating at a temeprature of from 30 to 100° F. below the temperature necessary for optimum yield of $CH_2O$ is markedly advantageous.

Figure 4:
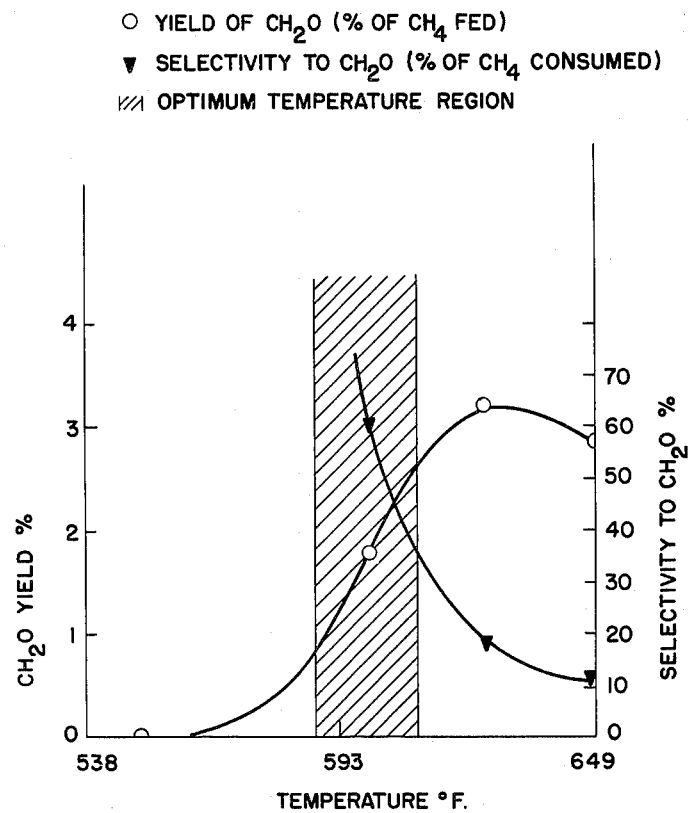

This discovery is illustrated by FIGURE 4 which shows the yield of $CH_2O$ per pass based on $CH_4$ fed and selectivity to $CH_2O$ based on $CH_4$ consumed plotted against the temperature. It can be seen that the yield of the reaction increases with temperature and goes through a maximum. The selectivity continually decreases with temperature.

In an optimum process, the selectivity and the yield must both be as high as possible. The selectivity must be higher than about 35% and the yield must be greater than about 1%. For example, under the specific conditions of the example shown in FIGURE 4, it is necessary to carry out the process at temperatures greater than 588° C. and less than 610° C. (shown by the shaded region). The region changes somewhat with other conditions, such as surface to volume ratio, but as long as one stays within the conditions of pressure, surface to volume ratio and catalyst ratio that have been found to be economical, this shaded region generally occurs between 20 and 50° C. below the maximum in the yield curve.

What is claimed is:

1. A process for producing formaldehyde which consists of passing a methane-containing hydrocarbon stream in vapor phase through a reactor having its internal walls coated with lead oxide in the presence of from 0.01 to 1 mole percent based on methane of an oxide of nitrogen and in contact with from about 2 to 20 mole percent molecular oxygen at a temperature of 500–700° C. for a period of 0.1–1.0 second, and recovering a reaction product mixture containing formaldehyde.

2. A process in accordance with claim 1 wherein a lead oxide coated surface to volume ratio of 2–37 cm.$^{-1}$ is employed.

3. A continuous process for the preparation of formaldehyde which consists of contacting a methane-containing gaseous hydrocarbon stream with nitric acid to absorb therein catalytic amount of nitrogen oxide and passing the resultant nitrogen oxide and methane-containing stream in vapor phase through a reactor having its internal surface coated with lead oxide in contact with from 2–20 mole percent molecular oxygen at a temperature of 500–700° C. and a pressure from atmospheric to 50 atmospheres for a period of 0.1–1.0 second, and recovering reaction product therefrom.

References Cited by the Examiner

UNITED STATES PATENTS 3,014,969 12/1961 Magee _____ 260—604
3,032,588 5/1962 Magee _____ 260—604

LEON ZITVER, *Primary Examiner.*